United States Patent
Post et al.

(10) Patent No.: US 9,727,570 B2
(45) Date of Patent: *Aug. 8, 2017

(54) MOUNT-TIME UNMAPPING OF UNUSED LOGICAL ADDRESSES IN NON-VOLATILE MEMORY SYSTEMS

(75) Inventors: Daniel J. Post, Campbell, CA (US); Eric Tamura, Sunnyvale, CA (US); Vadim Khmelnitsky, Foster City, CA (US); Nir J. Wakrat, Los Altos, CA (US); Matthew Byom, San Jose, CA (US)

(73) Assignee: APPLE INC., Cupertino, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 13/152,839

(22) Filed: Jun. 3, 2011

(65) Prior Publication Data

US 2012/0311298 A1    Dec. 6, 2012

(51) Int. Cl.
| | |
|---|---|
| *G06F 12/00* | (2006.01) |
| *G06F 13/00* | (2006.01) |
| *G06F 13/28* | (2006.01) |
| *G06F 17/30* | (2006.01) |
| *G06F 3/06* | (2006.01) |

(52) U.S. Cl.
CPC ...... *G06F 17/30138* (2013.01); *G06F 3/0608* (2013.01); *G06F 3/0643* (2013.01); *G06F 3/0679* (2013.01); *G06F 3/064* (2013.01); *G06F 3/0644* (2013.01)

(58) Field of Classification Search
CPC .... G06F 3/0608; G06F 3/0643; G06F 3/0679; G06F 17/30138

USPC ............................................ 711/101
See application file for complete search history.

(56) References Cited

U.S. PATENT DOCUMENTS

| | | | |
|---|---|---|---|
| 7,356,662 B2 | 4/2008 | Shoff et al. | |
| 7,454,653 B2 | 11/2008 | Nicholson et al. | |
| 7,493,424 B1 | 2/2009 | Bali et al. | |
| 8,130,554 B1* | 3/2012 | Linnell | 365/185.28 |
| 2003/0088812 A1* | 5/2003 | Lasser | 714/42 |

(Continued)

FOREIGN PATENT DOCUMENTS

| | | |
|---|---|---|
| TW | 200917021 | 4/2009 |
| WO | WO 2009118917 A1 * | 10/2009 |

(Continued)

OTHER PUBLICATIONS

"Developing a Filesystem Optimised for Solid State Hard Drives", Dinwiddy, May 7, 2010 (227 pages).*

(Continued)

*Primary Examiner* — Daniel C Chappell
(74) *Attorney, Agent, or Firm* — Van Court & Aldridge LLP (57) ABSTRACT

Systems and methods are provided for unmapping unused logical addresses at mount-time of a file system. An electronic device, which includes a non-volatile memory ("NVM"), may implement a file system that, at mount-time of the NVM, identifies all of the logical addresses associated with the NVM that are unallocated. The file system may then pass this information on to a NVM manager, such as in one or more unmap requests. This can ensure that the NVM manager does not maintain data associated with a logical address that is no longer needed by the file system.

7 Claims, 4 Drawing Sheets

(56) References Cited

U.S. PATENT DOCUMENTS

| | | | |
|---|---|---|---|
| 2006/0015676 A1* | 1/2006 | Oribe et al. | 711/103 |
| 2007/0073962 A1* | 3/2007 | Nakamura et al. | 711/103 |
| 2008/0195799 A1* | 8/2008 | Park | 711/103 |
| 2008/0229428 A1 | 9/2008 | Camiel | |
| 2008/0307192 A1* | 12/2008 | Sinclair et al. | 711/218 |
| 2009/0043959 A1* | 2/2009 | Yamamoto | 711/112 |
| 2009/0222688 A1* | 9/2009 | Kurashige | 714/5 |
| 2010/0169556 A1* | 7/2010 | Nakanishi et al. | 711/103 |
| 2011/0078363 A1* | 3/2011 | Yeh et al. | 711/103 |
| 2011/0099324 A1* | 4/2011 | Yeh | 711/103 |
| 2011/0125954 A1* | 5/2011 | Yeh et al. | 711/103 |
| 2011/0238886 A1 | 9/2011 | Post et al. | |
| 2012/0054541 A1* | 3/2012 | Byom et al. | 714/6.13 |
| 2013/0151830 A1* | 6/2013 | Post et al. | 713/2 |

FOREIGN PATENT DOCUMENTS

| | | |
|---|---|---|
| WO | WO 2010111694 A2 * | 9/2010 |
| WO | 2011/035245 | 3/2011 |

OTHER PUBLICATIONS

"Query Results for mkfs.ext4: in the all Man Page Set—Section 8", The Unix and Linux Forums, Dec. 2010, http://www.unix.com/man-page/All/8/mkfs.ext4/ (7 pages).*

Intel Solid-State Drive Optimizer, copyright 2009, http://download.intel.com/design/flash/nand/mainstream/Intel_SSD_Optimizer_White_Paper.pdf (8 pages).*

White Paper: The TRIM Command, Nathan Edwards, Dec. 2, 2009, retrieved from http://www.maximumpc.com/article/features/white_paper_trim_command on Jul. 18, 2013 (4 pages).*

SDB:SSD discard (trim) support, openSUSE Support Database, Sep. 13, 2010, retrieved from http://web.archive.org/web/20100913125059/http://en.opensuse.org/SDB:SSD_discard_(trim)_support on Jul. 18, 2013 (3 pages).*

Enabling and Testing SSD TRIM Support Under Linux, Rob Williams, May 6, 2011, retrieved from http://techgage.com/article/enabling_and_testing_ssd_trim_support_under_linux/1/ on Jul. 18, 2013 (5 pages).*

Using Context Clues to Aid Reading, eWriting, retrieved from http://flang1.kendall.mdc.edu/cpt/R04/3_RO4lecture1/R04lecture1.htm on Dec. 11, 2013 (1 page).*

Definition mount, Margaret Rouse, Sep. 2005, retrieved from http://whatis.techtarget.com/definition/mount on Dec. 16, 2013 (1 page).*

What's Important for Information Security: A Manager's Guide, M. E. Kabay, retrieved from http://www.mekabay.com/infosecmgmt/mgrguidesec.pdf on Dec. 16, 2013 (4 pages).*

Solid state drive data recovery in open source environment; Aldaej et al; 2nd International Conference on Anti-Cyber Crimes; Mar. 26-27, 2017 (4 pages).*

Dinwiddy, "Developing a Filesystem Optimised for Solid State Hard Drives." May 7, 2010, pp. 44-51, http://www.cs.bath.ac.uk/~mdv/courses/CM30082/projects.bho/2009-10/Dinwiddy-JJ-dissertation-2009-10.pdf.

Microsoft, "Defragging SSDs a Default?" Mar. 2, 2012, p. 2, http://social.technet.microsoft.com/Forums/en-US/w8itprogeneral/thread/f97425f8-3857-4aa4-9cf5-437d5e212c9c/.

* cited by examiner

MOUNT-TIME UNMAPPING OF UNUSED LOGICAL ADDRESSES IN NON-VOLATILE MEMORY SYSTEMS

BACKGROUND OF THE DISCLOSURE

NAND flash memory, as well as other types of non-volatile memories ("NVMs"), are commonly used in electronic device for mass storage. For example, consumer electronics such as portable media players, often include NAND flash memory to store music, videos, and other media programs.

An electronic device can implement a file system to manage the file and folder structure of the device's memory components, such as a NVM. The file system can allocate logical addresses to each file in the NVM. To store or retrieve the file, the file system can issue read or write requests along with the file's logical addresses.

When a file stored in the NVM is no longer needed and is removed from the file system namespace, the file system can de-allocate the associated logical addresses and send an unmap request to the NVM system. If the unmap request is not properly processed by the NVM system, the NVM system may continue to operate as if the logical addresses are still in use. The NVM system will therefore maintain the data that was stored in the file even though this data is no longer needed and will never be requested by the file system. In particular, the NVM system will retain the data during garbage collection and wear leveling operations, which reduces the operating efficiency of the system. It will only be recycled when the particular logical address is overwritten by the contents of another file.

SUMMARY OF THE DISCLOSURE

Accordingly, systems and methods are provided for unmapping unused logical addresses at mount-time of the file system. This way, if previous unmap requests by the file system were not fully processed by the NVM system due to an unclean shutdown (e.g., from power loss, sudden forced user shutdown, or kernel panic), these discrepancies can be corrected and the operating efficiency of the system can be optimized.

An electronic device, which includes a non-volatile memory, can access and manage the non-volatile memory through an operating system's file system and a NVM manager (e.g., a NVM driver). At some point during operation of the electronic device, such as at bootup, the operating system can trigger a mount to incorporate the files stored in the NVM into the existing file and folder structure of the file system. This point in time may be referred to as "mount-time" of the file system or NVM.

At mount-time, the file system can generate a list of logical addresses (e.g., logical block addresses ("LBAs")) that are associated with the NVM but are not currently allocated for use. For example, the file system can maintain a LBA allocation table that includes a bitmap indicating which LBAs are currently allocated, and the file system can scan through the bitmap to generate the list of unallocated logical addresses. In some embodiments, since unallocated logical addresses are often grouped into "extents," the file system may use the bitmap to generate a list of unallocated LBA extents, where each extent is represented by a starting LBA and the number of LBAs in the extent.

Once the file system is finished generating at least part of the list, the file system may begin passing the list to the NVM manager. By providing the NVM manager with this information at mount-time, any LBA allocation discrepancies between the file system and the NVM manager may be corrected by the NVM manager before the drive is put into use. Moreover, LBA-synchronization may occur without the NVM manager having to maintain its own up-to-date LBA allocation table.

In some embodiments, to communicate the list of unallocated logical addresses to the NVM manager, the file system may issue one or more unmap requests. Because the list is comprehensive (i.e. includes all logical addresses that are unallocated), any previous unmap requests that the NVM manager was not able to complete (e.g., because of an unclean shutdown) are effectively reissued. This gives the NVM manager a second opportunity to complete the request. Other unmap requests may be associated with logical addresses that were already properly de-allocated by the NVM manager or were never allocated to begin with, and therefore the NVM manager can discard or ignore these requests.

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which.

DETAILED DESCRIPTION

Figure 1:
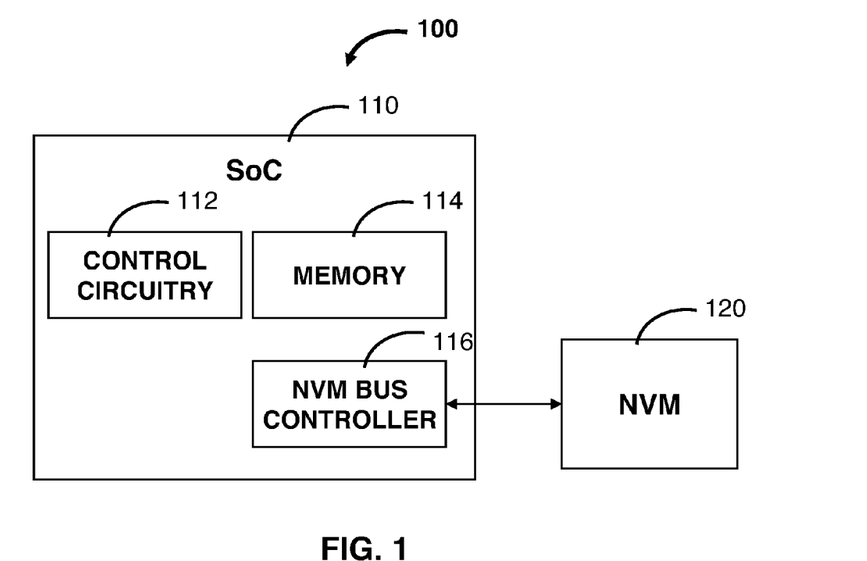
FIG. 1 is a block diagram of an illustrative electronic device having a non-volatile memory configured in accordance with various embodiments of the invention.

FIG. 1 is a block diagram of illustrative electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device or system.

Electronic device 100 can include system-on-a-chip ("SoC") 110 and non-volatile memory ("NVM") 120. NVM 120 can include a NAND flash memory based on floating gate or charge trapping technology, NOR flash memory, erasable programmable read only memory ("EPROM"), electrically erasable programmable read only memory ("EE- PROM"), Ferroelectric RAM ("FRAM"), magnetoresistive RAM ("MRAM"), or any combination thereof.

NVM 120 can be organized into "blocks", which is the smallest erasable unit, and further organized into "pages," which may be the smallest unit that can be programmed or read. In some embodiments, NVM 120 can include multiple integrated circuits, where each integrated circuit may have multiple blocks. The blocks from corresponding integrated circuits (e.g., blocks having the same position or block number) may form logical units referred to as "super blocks." Each memory location (e.g., page or block) of NVM 120 can be addressed using a physical address (e.g., a physical page address or physical block address).

System-on-a-chip 110 can include control circuitry 112, memory 114, and NVM bus controller 116. Control circuitry 112 can control the general operations and functions of SoC 110 and electronic device 100 in general. Control circuitry 112 can include any suitable components, circuitry, or logic, such as one or more processors. Control circuitry 112 may operate under the control of a program, such as an application, operating system, or a NVM driver loaded in memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, or any combination thereof. In some embodiments, memory 114 may act as the main memory for any processors implemented as part of control circuitry 112.

In some embodiments, memory 114 may be used to store at least a portion of the information (sometimes referred to as "metadata") needed for managing NVM 120. For example, a NVM manager (e.g., a NVM driver) may keep track of which logical addresses have recently been unmapped by the file system so that, at some subsequent time, the associated data in NVM 120 is not retained during garbage collection, wear leveling, or other NVM management operations. Because this information is stored in memory 114, which is volatile, and may not be reflected yet in the persistent storage of NVM 120, metadata indicating recently unmapped logical addresses may be lost during an unclean shutdown (e.g., due to power loss, sudden forced user shutdown, or kernel panic). This can cause operating inefficiencies, which are addressed and corrected using the described schemes below.

NVM bus controller 116 may enable SoC 110 to access NVM 120 and its memory locations, and may include any suitable circuitry or components. For example, NVM bus controller 116 may generate read, erase, and programming instructions compatible with the bus protocol (e.g., data rate) of NVM 120.

Figure 2:
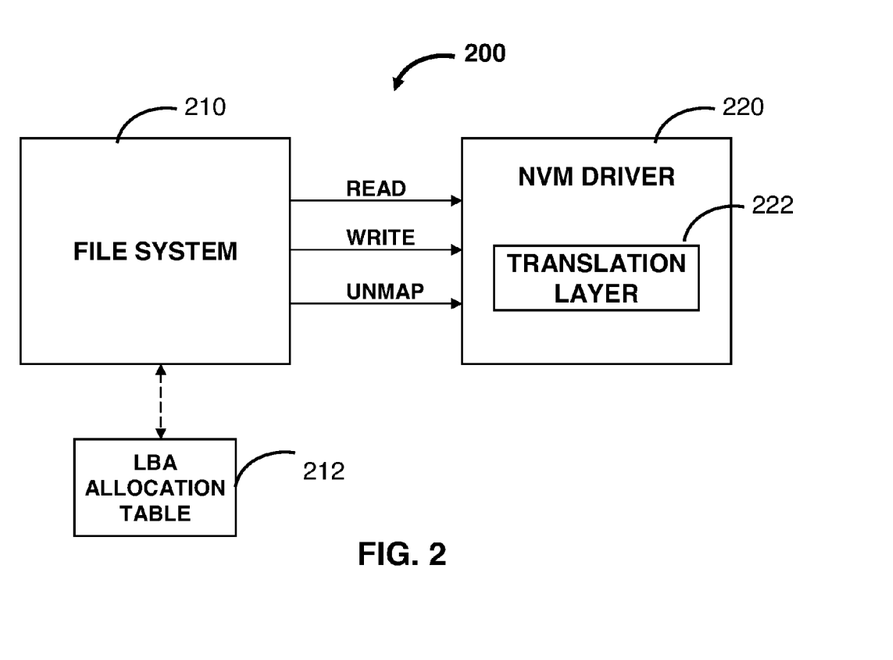
FIG. 2 is a flow diagram of software/firmware modules for accessing and managing a non-volatile memory configured in accordance with various embodiments of the invention.

FIG. 2 is a flow diagram of software/firmware modules 200 that may be executed by control circuitry 112 (FIG. 1), which gives the operating system access to the files in NVM 120 (FIG. 1). Software/firmware modules 200 may include file system 210 and NVM driver 220. File system 210 can include any suitable type of file system, such as a File Allocation Table ("FAT") file system or HFS file system, and may be part of the operating system. File system 210 may manage file and folder structures for the various memory components of electronic device 100 (FIG. 1), including NVM 120. To access NVM 120, file system 210 can issue at least three different types of requests to NVM driver 220: read, write, and unmap requests. With each type of request, file system 210 can provide a logical address, such as logical block address ("LBA").

File system 210 can maintain LBA allocation table 212. LBA allocation table 212 can indicate which logical addresses have been allocated to files stored in NVM 120. When issuing write requests to write a file to NVM 120, file system 210 can mark the associated logical addresses as allocated in LBA allocation table 212. When issuing unmap requests to NVM driver 220 to delete a file, file system 210 can mark the associated logical addresses as unallocated in LBA allocation table 212. Because LBA allocation table 212 is updated immediately upon allocation/de-allocation of a logical address, LBA allocation table 212 is kept up-to-date.

Figure 3:
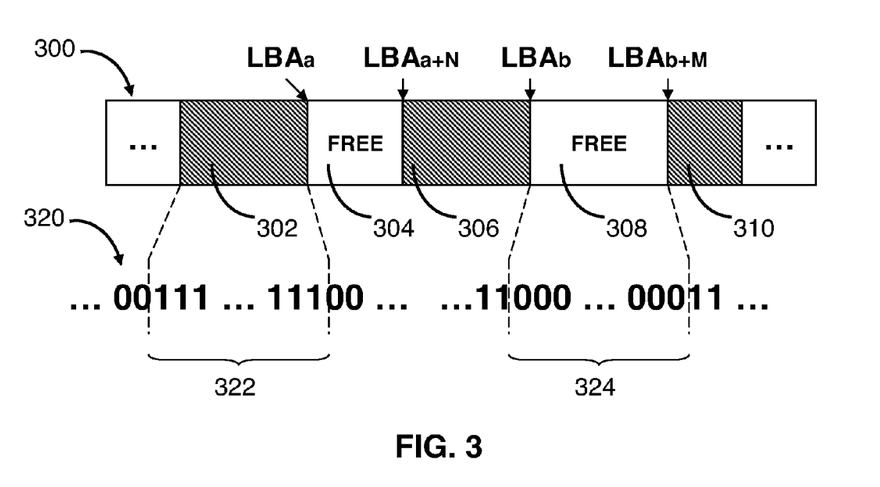
FIG. 3 is a graphical view of an illustrative LBA allocation table and a corresponding bitmap representation in accordance with various embodiments of the invention.

In some embodiments, file system 210 may be configured to allocate LBAs in contiguous groups referred to as LBA "extents." For example, file system 210 may allocate an LBA extent to a particular file. FIG. 3 gives an example of how allocating LBAs in this way may be reflected in LBA allocation table 212. In particular, FIG. 3 provides a graphical view 300 of an illustrative state of LBA allocation table 212 at some point in time. Graphical view 300 may illustrate the entire span of LBAs associated with NVM 120. LBA allocation table 212 can include allocated LBA extents 302, 306, and 310 (represented by shaded portions of graphical view 300). This leaves the unallocated LBAs grouped into contiguous segments, and therefore LBA allocation table 212 can further include unallocated LBA extent 304, which (in this example) starts at $LBA_a$ and ends at $LBA_{a+N}$, and unallocated LBA extent 308, which starts at $LBA_b$ and ends at $LBA_{b+M}$. The unallocated extents are represents by unshaded sections of graphical view 300 marked as "FREE."

In some embodiments, LBA allocation table 212 may include or take the form of a bitmap. Continuing the example of FIG. 3, LBA allocation table 212 can include or take on the form of bitmap 320. In bitmap 320, each LBA is represented by a binary digit, where '1' indicates that the associated LBA is allocated to a file and '0' indicates that the associated LBA is unallocated. Thus, as illustrated in FIG. 3, allocated LBA extent 302 may be represented by sequence 322 of '1' bits, where the number of LBAs in extent 302 is reflected in the number of '1' bits in sequence 322. Unallocated LBA extent 308, which includes M+1 unallocated LBAs, may be represented by sequence 324 of M+1 '0' bits.

In other embodiments, LBA allocation table 212 may use a format other than a bitmap to represent the state of the LBAs associated with the NVM. For example, LBA allocation table 212 may instead employ a tree of extents or a linked list chain. For clarity, however, various embodiments are described in this disclosure as employing bitmaps. It should be understood that such descriptions are merely illustrative and should not be construed as limiting the invention.

Returning to FIG. 2, file system 210 can interface with NVM driver 220. NVM driver 220 may include translation layer 222, such as a flash translation layer ("FTL"). Translation layer 222 can maintain a mapping of logical addresses (e.g., LBAs) to physical addresses, which correspond to actual memory locations (e.g., pages, blocks, integrated circuits, etc.) of NVM 120. Translation layer 222 can use this mapping to translate the logical addresses provided on read, write, or unmap requests to their associated physical addresses. Because each NVM may have a different layout depending on the size or vendor of the NVM, these translation operations may be memory and/or NVM-vendor-specific. NVM driver 220 can perform any other suitable functions in addition to logical-to-physical address mapping. For example, translation layer 222 can perform any of the other functions that may be typical of flash translation layers, such as garbage collection and wear leveling.

FIGS. 1 and 2 are depicted and described thus far as having all NVM management performed on a SoC 110 (FIG. 1). It should be understood that such NVM-related functionality is not limited in this way. For example, any of the components or functionality of NVM bus controller 116 (FIG. 1) and/or NVM driver 220 (FIG. 2) may be implemented and performed by a separate memory controller (e.g., flash controller) included, for example, in NVM 120 (FIG. 1). Therefore, because NVM management can be performed by other combinations of components, any software, firmware, hardware, or combination thereof that is configured to manage a non-volatile memory will be referred to simply as a "NVM manager."

As described above, a NVM manager (e.g., NVM driver 220) may receive an unmap request with a logical address from a file system (e.g., file system 210). The NVM manager may receive the unmap request when the file system has de-allocated the logical address in its LBA allocation table and no longer needs the data associated with the logical address. The unmap request, therefore, informs the NVM manager that there is data stored in the NVM that should not be retained during garbage collection, wear leveling, or other NVM managing operations. However, in response to receiving an unmap request, the NVM manager may send an acknowledgement of the unmap request back to the file system without making any immediate changes in non-volatile memory. The NVM manager may instead keep track of the unmap request in volatile memory (e.g., memory 114). For example, the NVM manager may invalidate a corresponding entry in a logical-to-physical address mapping stored in memory 114. Because the unmap request is reflected only in volatile memory, if an unclean shutdown occurs so that the NVM manager does not have the opportunity to commit the unmap request to persistent memory, the unmap request will be lost. In these situations, there may be a discrepancy between which LBAs are allocated in the file system's LBA allocation table and which LBAs are still allocated from the point of view of the NVM manager. Such discrepancies can result in the NVM manager performing extra garbage collection operations to maintain data that is no longer needed. These extra operations may cause undesirable system effects, such as higher write amplification ("wAmp"), reduced efficiency (i.e. lower performance and higher command latency), and more power draw.

Accordingly, at mount-time of the NVM, a file system (e.g., file system 210) may be configured to provide the NVM manager (e.g., NVM driver 220) with a comprehensive list of which logical addresses are unallocated. For example, in some embodiments, the file system can send unmap requests for all unallocated LBAs. This way, if any unmap requests had previously been lost due to an unclean shutdown (for example), the NVM manager is effectively receiving the unmap request again and has a second opportunity to fulfill the unmap request. By providing the NVM manager with information on the unmapped LBAs at mount-time, any LBA allocation discrepancies between the file system and the NVM manager may be corrected by the NVM manager before the drive is put into use.

Moreover, using this approach, LBA-synchronization may occur without the NVM manager having to maintain its own up-to-date LBA allocation table in non-volatile memory. Instead, upon receiving an unmap request, the NVM manager can mark the associated logical addresses as invalid in volatile memory (e.g., in a logical-to-physical address translation table) and can delay making a similar marking in the NVM (e.g., in a translation table stored in the index pages of the NVM). The NVM manager can also delay making any other changes to the NVM that would reflect the unmap, such as garbage collection or wear leveling operations. The NVM manager may maintain LBA synchronization with the file system without immediately committing the unmap to non-volatile memory, because the NVM manager can rely on re-receiving the necessary unmap requests on the next mount should an unclean shutdown occur.

The file system can provide a list of unallocated logical addresses to the NVM manager using any suitable format or protocol. In some embodiments, the file system can send the list through one or more unmap requests, where the unmap requests are of the same format as those issued during run-time (i.e. post-mount) of the electronic device. The number of requests can depend on the number of unallocated LBAs or LBA extents that need to be communicated. In other embodiments, the file system can send the list using a different protocol, such as with a special command (i.e. different than the typical run-time read, write, or unmap requests).

The file system can attempt to send the entire list of unallocated LBAs or LBA extents to the NVM manager at once. However, an implementation allowing the entire list to be sent at once may require an overly large buffer that can store the worst case scenario list (i.e. where every other LBA is unallocated so that there are many single-LBA extents). A buffer this large may even exceed the size of the memory (e.g., memory 114 of FIG. 1). Therefore, this implementation may only be suitable in specific circumstances or embodiments. Alternatively, the file system may be configured to iteratively create and pass partial lists to the NVM manager so that, at most, only a predetermined amount of memory is used at any given time. That is, creating and passing partial lists may allow the file system to use a smaller-sized buffer that takes up a suitably small portion of the memory.

Figure 4:
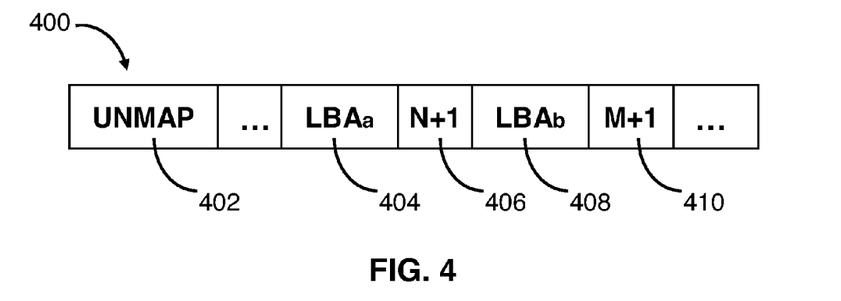
FIG. 4 is a graphical view of an illustrative unmap request, which is generated based on the bitmap of FIG. 3 and can be issued by a file system to a NVM manager, in accordance with various embodiments of the invention.

FIG. 4 provides an example of one way in which a file system (e.g., file system 210) can provide a list of unallocated logical addresses to a NVM manager (e.g., NVM driver 220) at mount-time. In particular, continuing the example started in FIG. 3, FIG. 4 shows illustrative unmap request 400 that the file system may issue to the NVM manager given the state of LBAs shown in graphical view 300. Unmap request 400 can include header 402 to allow the NVM manager identify the request as an unmap request.

Unmap request 402 may then provide at least a partial list of the unallocated LBA extents. In unmap request 400, each LBA extent is represented in the list by (1) the first LBA in the extent and (2) the number of LBAs in the extent (or the "length" of the extent). For example, unallocated LBA extent 304 (FIG. 3) may be described by starting LBA 404 and length 406, and unallocated LBA extent 308 (FIG. 3) may be described by starting LBA 408 and length 410.

The format of unmap request 400 is merely illustrative, and the file system can communicate unallocated LBAs or LBA extents using any other suitable approach. For example, the file system can represent each unallocated extent by a starting LBA and an ending LBA. As another example, instead of conveying unallocated LBA extents, the file system can list each individual LBA.

Figure 5:
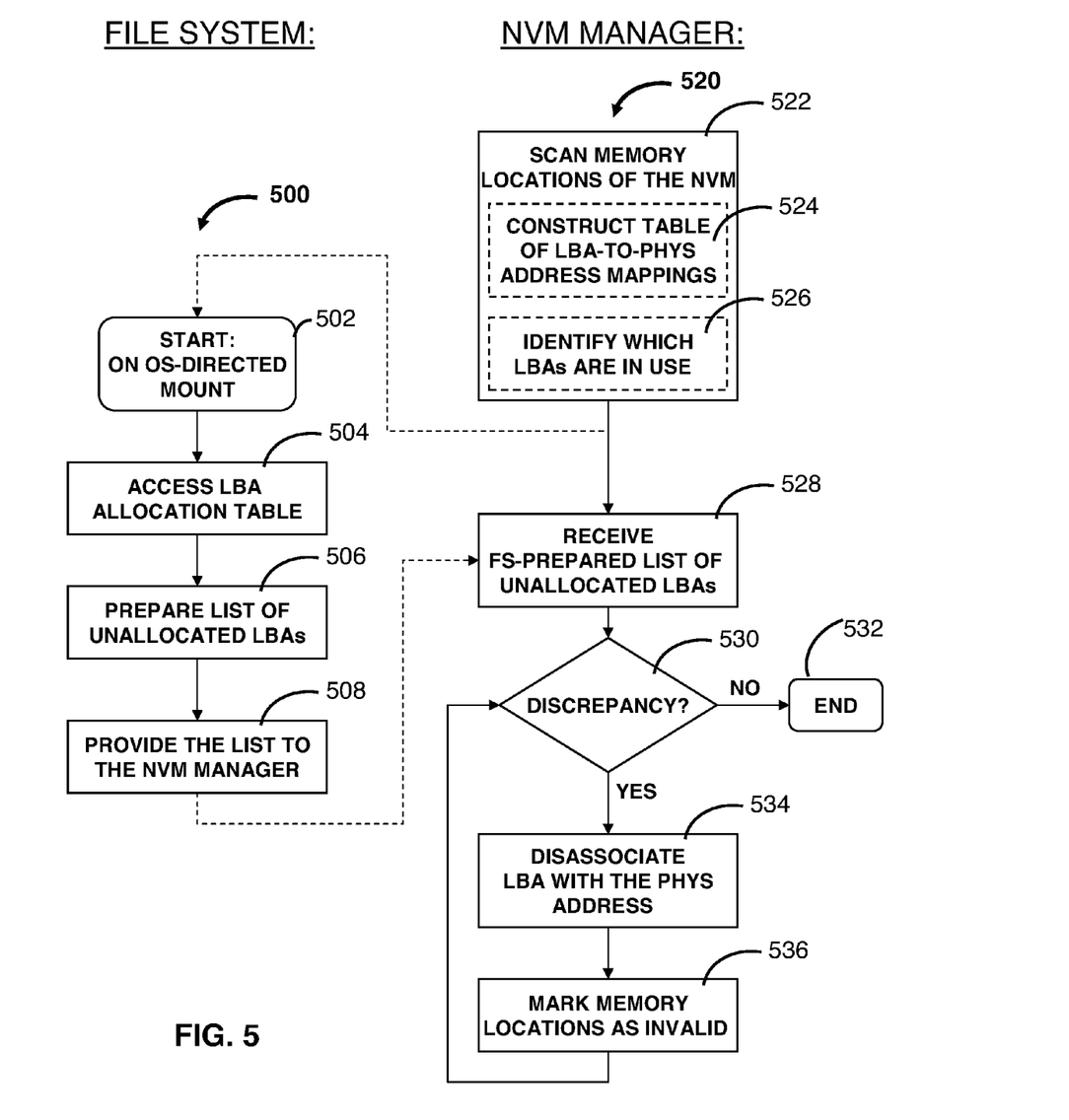
FIG. 5 is a flowchart of illustrative processes for correcting LBA allocation discrepancies between a file system and a NVM manager in accordance with various embodiments of the invention.
Figure 6:
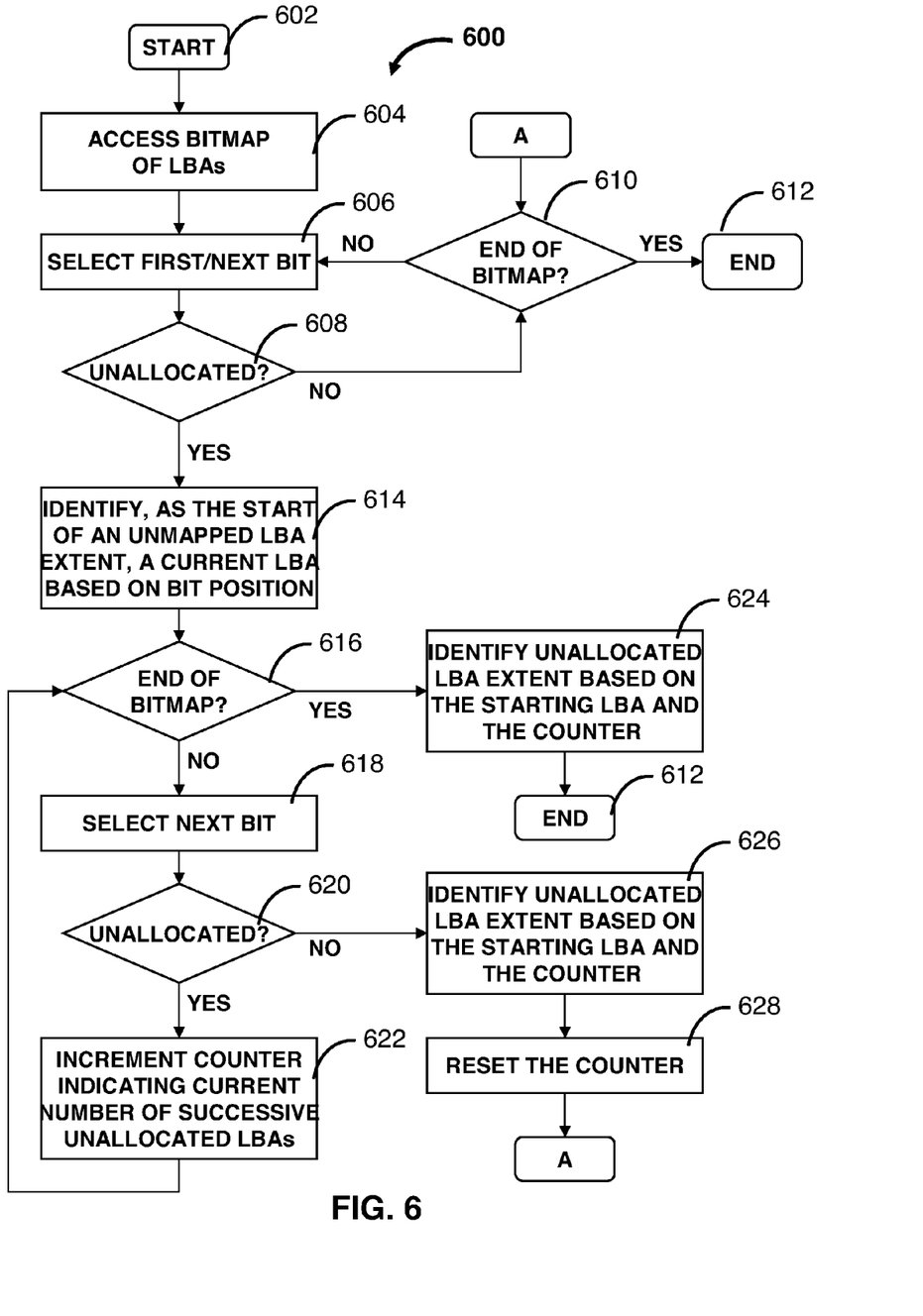
FIG. 6 is a flowchart of an illustrative process for preparing a list of unallocated LBA extents suitable for passing from a file system to a NVM manager in accordance with various embodiments of the invention.

Referring now to FIGS. 5 and 6, flowcharts of illustrative processes are shown in accordance with various embodiments of the invention.

Looking first to FIG. 5, a flowchart of illustrative processes 500 and 520 are shown for correcting LBA allocation discrepancies between a file system (e.g., file system 210)

and a NVM manager (e.g., NVM driver 220). Process 500 can be performed by the file system, and process 520 can be performed by the NVM manager.

Process 500 can begin at step 502 responsive to a mounting procedure triggered by the operating system to mount the NVM. Step 502 may occur after the file system has gained access to the NVM through the NVM manager (i.e. after step 522 of process 520, discussed below). In some scenarios, the operating system may start the mounting procedure during bootup of the electronic device. At step 504, the file system can access a LBA allocation table, and in particular, can access the entries in the table associated with the NVM. In some embodiments, step 504 may involve accessing a bitmap. Then, at step 506, the file system can prepare a list of the unallocated LBAs, such as a list of unallocated LBA extents. The list may be comprehensive in that it includes all of the LBAs associated with the NVM that are not currently being used by the file system. At step 508, the file system can provide the list to the NVM manager. In some embodiments, the list can be provided by issuing one or more unmap requests to the NVM manager.

Looking now to process 520, NVM manager may begin executing the steps of process 520 at any suitable time, such as upon loading of a NVM driver or upon bootup of an electronic device. At step 522, the NVM manager may scan through the memory locations of the NVM, such as through each page of the NVM. During the scan, the NVM manager can perform step 524 of constructing translation tables that map logical addresses (e.g., LBAs) to physical addresses. For example, the valid programmed pages of the NVM can each store an associated LBA, and the NVM manager can use the stored LBAs to populate the table. This way, the NVM manager can identify which LBAs are in use (i.e., allocated) at step 526. Once step 522 is completed and the allocated LBAs are identified (i.e. enumerated) and mapped to their respective physical addresses, the NVM manager can begin handling file system requests. In particular, the NVM manager can handle read, write, and unmap requests, such as a file system request to read data corresponding to the LBA allocation table (i.e. at step 504 of process 500, discussed above).

Continuing to step 528, the NVM manager may receive, from the file system, a list of unallocated LBAs, such as a list of all of the unallocated LBA extents. This information can be received, for example, via one or more unmap requests prepared and issued at mount-time of the file system.

Then, at step 530, the NVM manager can determine whether there are any discrepancies between the LBAs identified by the NVM manager at step 526 as being allocated and the LBAs that the file system indicated were actually unallocated. If there are any discrepancies, this may be due to previous unmap requests that were lost during an unclean shutdown (e.g., power loss, sudden forced user shutdown, or kernel panic). If there are no discrepancies determined at step 530, process 520 can end at step 532 without performing any corrective measures. For example, if none of the LBAs received in the unmap requests appear in the logical-to-physical address mapping, there is nothing for the NVM manager to do. Thus, the NVM manager can effectively ignore and discard the unmap requests, allowing process 520 to end without making any changes to volatile or non-volatile memory.

If, at step 530, the NVM manager instead determines that there are LBA allocation discrepancies, process 520 can continue to step 534, where the NVM manager can perform corrective measures to eliminate the discrepancies. In some embodiments, a discrepancy is realized at step 530 when an unmap request is received that includes a LBA that can be found in the NVM manager's logical-to-physical address mapping. In this case, the NVM manager can process the unmap request instead of ignoring the request. For example, at step 534, the NVM manager can disassociate the received LBA with the physical address in the logical-to-physical address mapping, and at step 536, the NVM manager can mark the associated NVM memory locations (e.g., pages, blocks, or super blocks) as invalid. These corrective steps can be performed by making changes in volatile memory, if desired, because the NVM manager can rely on the file system re-sending the list of unallocated LBAs should another unclean shutdown occur. This way, the NVM manager does not need to make changes to non-volatile memory until it is a suitable time to perform garbage collection, wear leveling, or another NVM management operation.

Following step 536, process 520 can return to step 530 to check for additional discrepancies. For example, the NVM manager can continue checking for unmap requests that include LBAs which need to be unmapped.

Turning now to FIG. 6, a flowchart of illustrative process 600 is shown for preparing a list of unallocated LBA extents. Process 600 can be performed by a file system, such as file system 210 of FIG. 2, which maintains a bitmap similar to bitmap 320 of FIG. 3. In some embodiments, process 600 may provide a more detailed view of how the file system can complete step 506 of process 500 (FIG. 5). Process 600 may therefore be performed so that the file system can communicate all of the unallocated LBA extents to a NVM manager (e.g., NVM driver 220 of FIG. 2).

Process 600 may begin at step 602 following, for example, the operating system triggering a mount of the file system. At step 604, the file system can access the bitmap of LBAs associated with the NVM (e.g., NVM 120 of FIG. 1). The file system can select the first bit of the bitmap at step 606 and then, at step 608, can determine whether this first bit is unallocated. For example, the file system may determine whether the bit value is a '0,' indicating that the bit is unallocated, or whether the bit value is '1,' indicating the bit is allocated.

If, at step 608, the file system determines that the first bit is allocated, this bit is not part of an unallocated LBA extent that needs to be communicated to the NVM manager. Thus, process 600 can return to step 606, where the file system selects the next bit in the bitmap (after ensuring, at step 610, that there are additional bits in the bitmap). The file system may continue to iterate between steps 606, 608, and 610 until the file system comes across a bit associated with an unallocated LBA (e.g., a bit in the bitmap having a '0' bit value). At this time, the file system can identify the unallocated LBA based on the current bit's position in the bitmap. The unallocated LBA identified at step 614 is the start of an unallocated LBA extent that the file system will communicate to the NVM manager.

Now that the start of an unallocated LBA extent has been established, the file system can determine how long the extent is. To keep track of the length of the current extent, the file system may maintain a counter. The file system increments the counter each time another unallocated LBA (e.g., '0' in the bitmap) is found without encountering an allocated LBA (e.g., '1' in the bitmap) or the end of the bitmap. In particular, the file system can select the next bit in the bitmap at step 618 (after ensuring that there are additional bits in the bitmap at step 616), determine at step 620 whether the selected bit indicates that the associated LBA is also unallocated, and increment the counter at step 622 if the LBA is unallocated.

Step 616 through step 620 can be iterated until the end of the current unallocated LBA extent is reached. The end of the current extent may be identified when, at step 616, the file system determines that there are no more bits in the bitmap associated with the NVM or when, at step 620, the file system determines that the next bit in the bitmap corresponds to an allocated LBA. At this point, process 600 can continue from step 616 to step 624 or from step 620 to step 626. At step 624 or step 626, the file system has sufficient information on the current unallocated LBA extent to identify the entire extent and pass the information on to the NVM manager. The file system can identify and provide the extent in any suitable form, such as by giving the starting LBA in the extent (established at step 610) and the length of the extent (as conveyed by the counter). Unmap request 400 of FIG. 4 is one example of a request that uses this approach.

From step 624, process 600 may end at step 612, since the end of the bitmap has been reached and there are no more unallocated LBA extents to communicate to the NVM manager. From step 626, however, there may be additional unallocated LBA extents to identify, so process 620 continues to step 628. At step 628, the file system can reset the counter in preparation for finding another unallocated LBA extent. Then, process 600 may return to beginning, where the file system may look for another unallocated LBA at steps 606, 608, and 610. If there are no additional unallocated LBA extents to fine, the file system will eventually come across the end of the bitmap at step 610 and process 600 can end at step 612 thereafter.

It should be understood that the steps of processes 500/520 and 600 of FIGS. 5 and 6, respectively, are merely illustrative. Any of the steps may be modified, removed, or combined, and additional steps may be included, without departing from the scope of the invention.

The described embodiments of the invention are presented for the purpose of illustration and not limitation.

What is claimed is:

1. A system comprising:
   a non-volatile memory ("NVM"); and
   circuitry operable to execute an operating system and a NVM manager, wherein the operating system comprises a file system configured to:
   prepare, responsive to the operating system triggering a mount of the NVM, a file system list of unallocated logical addresses associated with the NVM; and
   transmit the file system list of unallocated logical addresses to the NVM manager; and
   wherein the NVM manager is operative to:
   manage a table of logical address to physical address mappings, wherein the table of logical address to physical address mappings is stored on the NVM;
   identify, using the table of logical to physical address mappings stored on the NVM, which logical addresses are in use;
   receive the file system list of unallocated logical addresses;
   determine which of the identified logical addresses that are in use are included in the file system list of logical addresses;
   disassociate the identified logical addresses that are determined to be included in the file system list of logical addresses with their respective physical addresses in the table of logical address to physical address mappings.

2. The system of claim 1, wherein the operating system is configured to trigger the mounting of the NVM at bootup of the system.

3. The system of claim 1, wherein the file system is further configured to maintain a bitmap indicating which of the logical addresses associated with the NVM are allocated, and wherein the file system is configured to identify the unallocated logical addresses based on the bitmap.

4. The system of claim 1, wherein the NVM is NAND flash memory.

5. An electronic device comprising:
   a non-volatile memory ("NVM"); and
   control circuitry operable to execute a file system and a NVM manager, wherein the NVM manager manages a table of logical address to physical address mappings that are stored on the NVM, and wherein the file system is configured to:
   prepare a comprehensive list of unallocated logical addresses associated with the NVM; and
   issue to the NMV manager a plurality of unmap requests to de-allocate the comprehensive list of unallocated logical addresses, wherein the plurality of unmap requests comprise:
   a first unmap request that provides a first opportunity for the NVM manager to de-allocate, at mount-time of the file system, a first logical address in response to comparing the comprehensive list to the table of logical address to physical address mappings stored on the NVM; and
   a second unmap request to de-allocate the first logical address subsequent to the mount-time of the file system, wherein the second unmap request provides a second opportunity for the NVM manager to de-allocate the first logical address in response to comparing the comprehensive list to the table of logical address to physical address mappings stored on the NVM.

6. The electronic device of claim 5, wherein the file system is further configured to maintain a logical address allocation table, wherein the second unmap request is issued responsive to determining at mount-time that the first logical address is unallocated in the logical address allocation table.

7. The electronic device of claim 5, further comprising a volatile memory, wherein the NVM manager is configured to, responsive to receiving the first unmap request:
   mark, in the volatile memory, the logical address as invalid; and
   delay making changes in the NVM that are associated with the invalidating of the logical address.

* * * * *